United States Patent [19]

Wu

[11] Patent Number: 5,491,794
[45] Date of Patent: Feb. 13, 1996

[54] FAULT PROTECTION USING MICROPROCESSOR POWER UP RESET

[75] Inventor: Chun H. Wu, Singapore, Taiwan

[73] Assignee: Thomson Consumer Electronics, S.A., France

[21] Appl. No.: 376,691

[22] Filed: Jan. 23, 1995

Related U.S. Application Data

[63] Continuation of Ser. No. 894,372, Jun. 4, 1992, abandoned.

[30] Foreign Application Priority Data

Jun. 27, 1991 [GB] United Kingdom .................. 9113924

[51] Int. Cl.[6] ................................................. G06F 11/00
[52] U.S. Cl. ............................... 395/182.21; 395/182.08; 348/177; 348/180; 348/730; 358/419; 358/421
[58] Field of Search ............................ 395/575, 182.21, 395/185.01, 182.08, 182.12; 371/12, 16.4, 16.5, 16.1, 29.1, 11.3; 348/177, 180, 377, 730, 725; 361/18

[56] References Cited

U.S. PATENT DOCUMENTS

| | | | |
|---|---|---|---|
| 3,462,640 | 10/1968 | Eltgloth | 315/411 |
| 3,535,445 | 10/1970 | Griffery | 315/411 |
| 4,282,460 | 8/1981 | Luz et al. | 315/411 |
| 4,524,411 | 6/1985 | Willis | 363/21 |
| 4,532,457 | 7/1985 | Haferl | 315/411 |
| 4,562,508 | 12/1985 | Chen et al. | 361/91 |
| 4,634,110 | 1/1987 | Julich et al. | 371/11.3 |
| 4,656,399 | 4/1987 | Testin et al. | 315/411 |
| 4,680,511 | 7/1987 | Fitzgerald et al. | 315/411 |
| 4,723,167 | 2/1988 | Griffey | 315/381 |
| 4,734,771 | 3/1988 | Lendaro et al. | 315/411 |
| 4,737,851 | 4/1988 | Shanley, II et al. | 315/411 |
| 4,761,723 | 8/1988 | Lendaro | 363/21 |
| 4,788,591 | 11/1988 | Decraemer | 358/190 |
| 4,797,771 | 1/1989 | Doty, II et al. | 361/88 |
| 4,868,466 | 9/1989 | Lendaro | 315/411 |
| 4,994,719 | 2/1991 | Lendaro | 315/411 |
| 5,013,980 | 5/1991 | Stephens et al. | 315/411 |
| 5,017,844 | 5/1991 | Lendaro | 315/408 |
| 5,036,257 | 7/1991 | Norman et al. | 315/381 |
| 5,036,261 | 7/1991 | Testin | 315/411 |
| 5,079,666 | 1/1992 | Najm | 361/85 |
| 5,093,605 | 3/1992 | Meinertz . | |
| 5,144,441 | 9/1992 | Sparks et al. | 358/190 |
| 5,175,441 | 12/1992 | Den Hollander | 307/43 |
| 5,327,172 | 7/1994 | Tan et al. | 348/378 |

FOREIGN PATENT DOCUMENTS 77103914   6/1988   China .

OTHER PUBLICATIONS

TX 81 Color TV Technical Training Manual, 1990.
CTC 168/169 Color TV Technical Training Manual 1990.

*Primary Examiner*—Robert W. Beausoliel, Jr.
*Assistant Examiner*—Dieu-Minh Le
*Attorney, Agent, or Firm*—Joseph S. Tripoli; Joseph J. Laks; Francis A. Davenport

[57] ABSTRACT

In a television receiver, a microprocessor controls a horizontal deflection circuit which is coupled to run mode power supply to define a standby operating mode and a run operating mode. The microprocessor has a power-up reset input terminal which initializes operation upon application of AC mains power. The run mode power supply is coupled to at least one load which is subject to overcurrent or overvoltage faults. A fault detection circuit detects fault conditions in the run mode power supply loads such as overvoltage or overcurrent and anomalous vertical deflection current. Upon fault detection the fault detection circuit triggers a power up reset circuit which applies a momentary reset pulse to the power-up reset input of the microprocessor. Upon receipt of the reset pulse, the microprocessor controls the horizontal deflection circuit to place the run mode power supply in the standby operating mode. Thus power is removed from the run mode load subject to the overvoltage or overcurrent or anomalous condition, and the television receiver assumes a standby condition.

18 Claims, 2 Drawing Sheets

FAULT PROTECTION USING MICROPROCESSOR POWER UP RESET

CROSS-REFERENCES TO RELATED APPLICATIONS

This is a continuation of application Ser. No. 07/894,372, filed Jun. 4, 1992, now abandoned.

FIELD OF THE INVENTION

BACKGROUND OF THE INVENTION

This invention relates to fault detection circuits for television receivers having a run mode in which run mode power supplies are active, and a standby mode in which power is provided only to selected load circuits.

Various potentially dangerous or potentially damaging faults may occur in television receivers as a result of open circuits, short circuits, failures of components and the like. One example of a potentially dangerous fault condition is emission of X-rays due to excessive electron beam current or overvoltage conditions in the high voltage ultor power supply. Another example of a potentially damaging fault is an open circuit in the vertical deflection winding which prevents electron beam scanning and causes the electron beam to burn the screen phosphors along a line or at a spot, permanently damaging the phosphors. It is known to detect fault conditions such as these, and to respond by disabling the power supply to selected run mode load circuits of the television receiver to alleviate the dangerous or damaging aspects of the fault.

Many television receivers include microprocessor controllers which, among other functions, control switching of the television receiver between the run mode in which all the power supplies and circuits are operational, and the standby mode in which power is supplied only to those circuits which are needed for switching back into the run mode when appropriate, i.e., the standby loads. In connection with a television receiver having an infrared remote control signal receiver, only the remote control receiver and the microprocessor servicing the remote control receiver need to remain powered in the standby mode, awaiting a signal from the user to switch back into the run mode. The remaining circuits, which are the run mode loads, are not powered in the standby mode.

Some run mode loads are powered as a function of horizontal deflection energization. For example, the high voltage supply for screen, focus and final anode electrodes, and certain other run mode supplies, are coupled to secondary windings of the horizontal output or flyback transformer. The primary winding of the horizontal output transformer is energized by flyback or retrace pulses generated by the horizontal output transistor.

In addition to generating power through the flyback transformer, a television receiver may also have a switched mode power supply that supplies and regulates power to run mode loads by adjusting the pulse width of pulses applied to the primary winding of a power transformer having secondary windings coupled to the respective run mode loads. Various DC supply voltages, may be developed to power run mode loads, including standby loads such as the microprocessor controller.

In the standby mode, the horizontal oscillator or the B+ power supply to the flyback transformer may be disabled, removing the supply of power to the run mode loads; whereas the microprocessor is powered as long as voltage is available at the AC mains. The microprocessor continues to execute its stored program in the standby mode, including input/output functions such as monitoring the remote control receiver, holding a run/standby output at a level that indicates a standby condition, etc.

A hold or save input may also be provided on the microprocessor for signalling impending loss of AC mains power. The hold input is activated immediately upon loss of power and signals the microprocessor, for example by interrupt, to store memory information respecting operational parameters at the time of the hold signal generation.

The microprocessor must be reset when the television receiver is initially coupled to the AC mains or upon restoration of AC mains power. A reset input is provided in order to clear or initialize certain internal registers in the microprocessor, for example the program counter, by means of a reset circuit which holds the reset input true for a short time after power is applied to the microprocessor. Program execution does not begin after power up until the reset input has been activated.

After the reset line has been activated, further microprocessor operations are disabled so long as the reset input is true, the microprocessor is unable to monitor its inputs, to place data on its outputs, or otherwise to execute instructions while the reset input is held true. The reset line must then be released to resume normal microprocessor programmed operation. Hence, it is not desirable to latch the reset input of the microprocessor upon detection of a fault, since this renders the microprocessor inoperative.

The microprocessor is programmed such that when commencing operation after a reset, the television receiver initially assumes the standby mode. It is thus necessary for the user to signal via the remote controller in order to switch from the standby mode to operation in the run mode.

It is known to couple a fault detection circuit having a latched output to a data input pin of a microprocessor, which by virtue of control programing, disables horizontal scanning as a protective measure, thus forcing the television receiver into the standby mode. However, it is desirable to avoid devoting an microprocessor input pin solely to this one function.

SUMMARY OF THE INVENTION

A video display device has fault protection apparatus comprising a horizontal deflection circuit coupled to a horizontal oscillator and controlled to be operative in a run mode and inoperative in a standby mode. A run mode power supply is energized by operation of the deflection circuit for supplying power to a run mode load. A fault detection circuit has at least one sensing input coupled to the run mode load to detect a fault condition and responsive to detection of the fault condition generates a reset signal. A microprocessor control circuit has a reset input coupled to the reset signal and has an output signal coupled for controlling the operation of the horizontal oscillator. The microprocessor enables the run mode absent detection of the fault condition. The microprocessor initiates the standby mode responsive to detection of the fault condition in the run mode load, thereby deactivating the deflection circuit, the run mode power supply and the run mode load.

In a further inventive arrangement the horizontal deflection circuit is dissabled upon overvoltage in a power supply coupled thereto and/or upon detection of an open or short circuit in the television receiver deflection circuits, thereby

DETAILED DESCRIPTION

Figure 1:
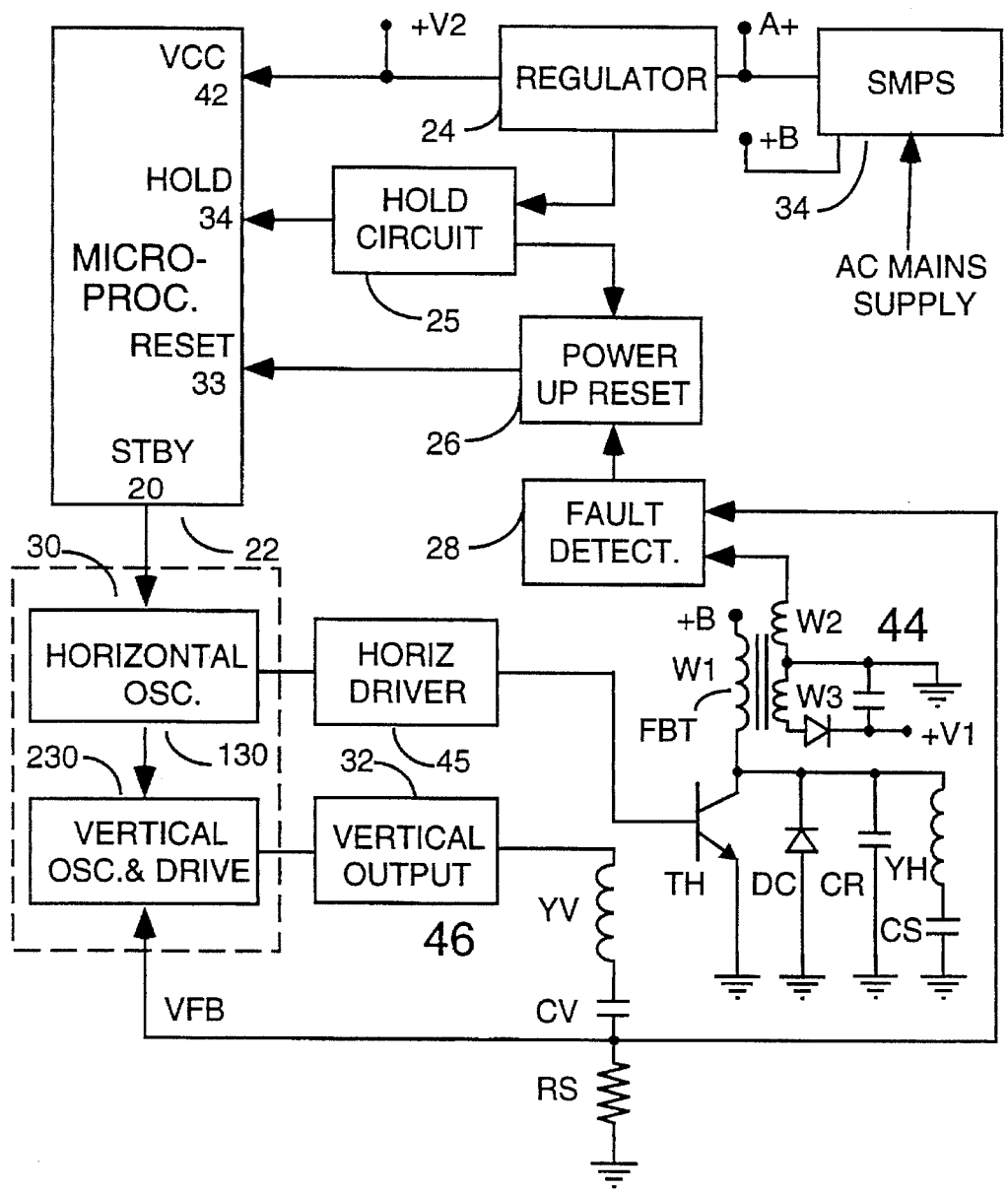
FIG. 1 is a schematic block diagram of a partial television receiver incorporating microprocessor controlled fault protection, according to the invention.

A microprocessor 22 as shown in FIG. 1, controls switching of the television receiver between the run mode and the standby mode, providing an output STBY which in the run mode enables operation of the horizontal deflection circuits of a deflection IC 30, for example type M520435P. Microprocessor 22 may be responsive to keyboard inputs or to remote control signals received by a remote control receiver, not shown, to initiate switching between modes. Microprocessor 22 may also control the television RF tuner, operate an on-screen display, and provide other functions as required.

In the run mode, generation and deflection of the electron beam of the television receiver cathode ray tube, not shown, is enabled when, for example, the STBY output of the microprocessor is logical low, and is disabled when STBY is logical high. When STBY is low, a SMPS voltage is coupled, via switch transistors (not shown), to power the horizontal oscillator 130 at pin 11 of deflection IC 30.

Horizontal oscillator 130 is coupled to a driver stage 45 (shown in FIG. 2) which drives a horizontal output stage 44, including a horizontal output transistor TH, a damper diode DC, a retrace capacitor CR, a horizontal deflection winding YH and an S-shaping capacitor CS. The primary winding W1 of a flyback transformer FBT is coupled to horizontal output stage 44 at the collector of transistor TH.

Secondary windings, partially shown, of the flyback transformer are coupled to various run mode power supplies. The voltages on the secondary windings tend to vary together, with variations in B+ input voltage and loading. Accordingly, the voltage level on one of the secondary windings may be sensed and compared to a reference, for detecting voltage variations on all the transformer secondaries.

The ultor voltage supply U (shown in FIG. 2) is a run mode load generated from the secondary windings of transformer FBT. In the event that the ultor voltage amplitude becomes excessive, X ray radiation may be produced. In accordance with an inventive feature, in the event of overvoltage, fault detector 28 monitors the voltage level of one of the secondary windings of transformer FBT, winding W2, and produces an output which is coupled to a reset circuit 26 of microprocessor 22. A reset to the microprocessor causes the receiver to assume the standby mode which removes power to the horizontal reference oscillator, which in turn removes the counted down drive signal from the horizontal output transistor, ceasing generation of the flyback derived voltages.

As a further inventive feature, in connection with a vertical deflection circuit 46, fault detector 28 is also arranged to trigger a microprocessor reset when the current in the vertical deflection winding YV is such as to indicate a potentially dangerous or damaging fault. In the event of a short or open circuit in either vertical deflection winding YV or circuitry, drive from vertical output stage 32, coupled to vertical oscillator and driver 230 of deflection integrated circuit 30, could become excessive; or the lack of vertical deflection could result in the electron beam burning the screen phosphors. Accordingly, the current in the deflection yoke YV, is sensed by the voltage across a current sensing resistor RS, which also provides the vertical feedback signal VFB. The current sense signal is supplied to fault detector 28 to initiate microprocessor reset upon detection of vertical deflection circuit fault. Resetting the microprocessor places the receiver in the standby mode wherein power to the horizontal oscillator section of IC30 is inhibited, terminating the reference oscillator signal that is counted down to produce the vertical rate drive signal.

Advantageously, the power-up reset input to the microprocessor provides a dual function, to reset the television receiver circuitry when the television receiver is initially connected to the AC mains or when AC mains power is restored after interruption, and to place the television receiver in a standby mode when a fault condition is detected. Microprocessor 22 is thus programmed to initiate operation in the standby mode following a reset, which can be generated by the power-up reset circuit 26 or by the fault detector 28.

The microprocessor must remain powered in both the run mode and the standby mode, since in the standby mode the microprocessor must monitor its inputs to detect a run mode command. A switched mode power supply 34, coupled to a voltage regulator 24, produces at least one output voltage A+, which is available in both the run mode and standby mode. Output voltage, A+ is regulated by transistor TR08, to provide voltage +V2 coupled to the VCC pin of microprocessor 22.

The A+ voltage supply is also coupled to hold circuit 25 which detects a loss of power and signals to the microprocessor that a power failure has occurred. As long as sufficient voltage remains at the microprocessor VCC pin to continue operation (e.g., during discharge of storage capacitors, reserve batteries and the like coupled to the VCC pin), the microprocessor responds to the HOLD signal at its input by storing present operating parameter data and otherwise performing an orderly power-down sequence. When power is restored, the television receiver can resume operation using these stored operating parameters. The hold input uses an input line of the microprocessor, such as an interrupt, for signalling loss of power.

By storing a record of the HOLD signal and checking for the record when initializing after a reset, the microprocessor can determine whether it is initializing after a fault detection or after a power loss and take appropriate action. For example upon occurrence of a predetermined number of successive fault detections, the microprocessor can shut down permanently and not respond to a further commands to switch into the run mode. This condition requiring that the television receiver be serviced, or decoupled temporarily from the AC mains supply, before the microprocessor will implement run commands and enter the run mode.

Figure 2:
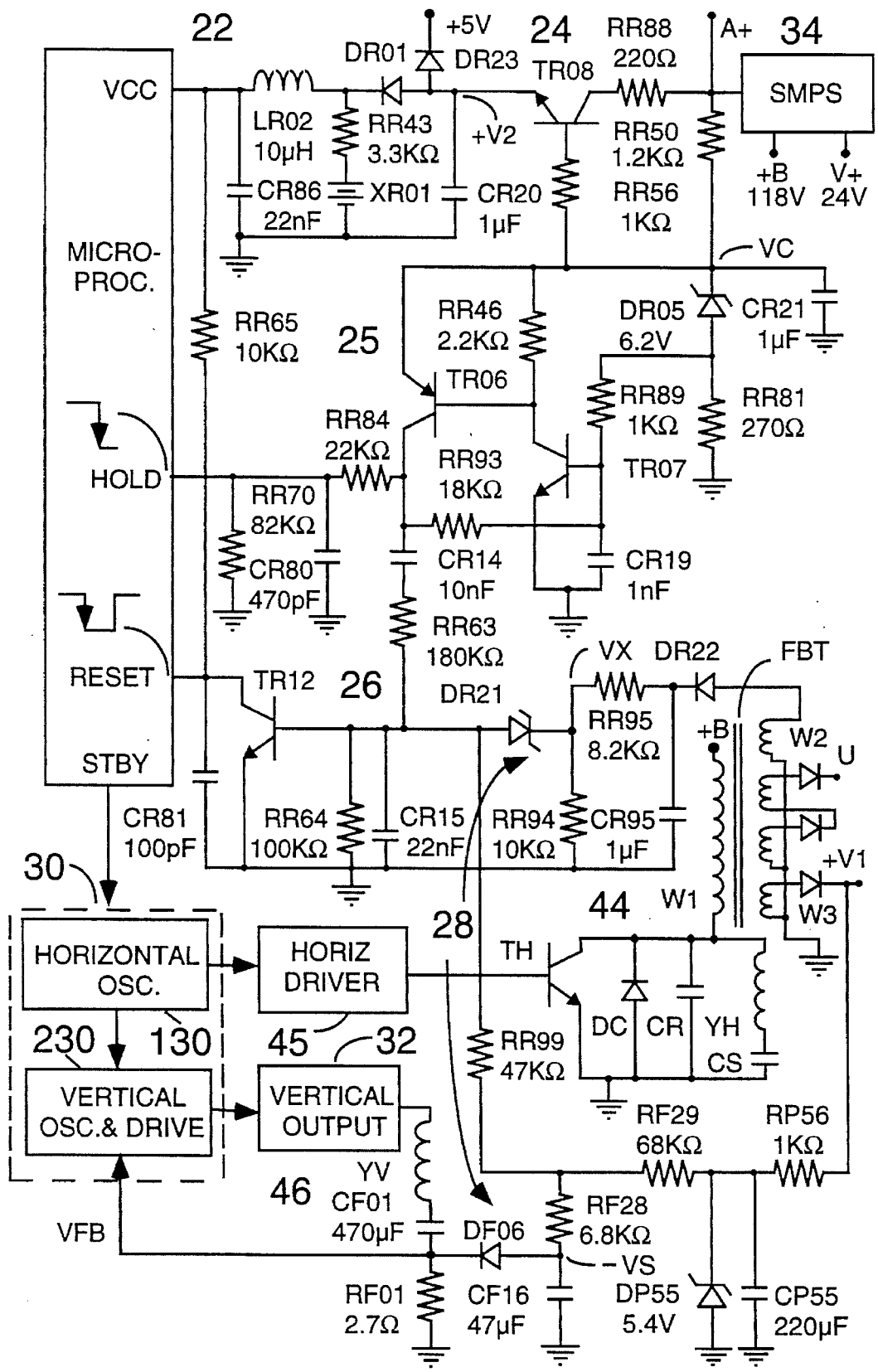
FIG. 2 is a detailed schematic diagram of FIG. 1, using reference numerals corresponding to those appearing in FIG. 1 to identify corresponding elements.

A more detailed embodiment is shown in FIG. 2. The output +V2, of series pass voltage regulator 24, is coupled to microprocessor 22 through a series diode DR01 and a choke LR02. A capacitor CR86 is coupled between the VCC pin and ground to provide noise suppression. In the event that voltage supply A+ fails, the VCC supply, to microprocessor 22, is sustained by current supplied by capacitor CR20, and battery XR01 coupled via resistor RR43. Under failure conditions, diode DR01 is reversed biased by battery DR01 voltage, thus preventing the powering of loads other than microprocessor 22. Diode DR23 couples the regulated +5 volts DC output of regulator 24 to additional loads, not shown.

The reference level of series regulator 24 is defined by a zener diode DR05, coupled to the base of a series pass transistor TR08 through a resistor RR56. The cathode of zener DR05 is coupled to the unregulated A+ supply, through a resistor RR50. A capacitor CR21 is coupled to the junction of resistor RR50 and the cathode of zener diode DR05. A resistor RR81, is coupled between the anode of zener diode DR05 and ground. Thus the voltage across resistor RR81 represents the current through zener diode DR05, and is present only when the voltage applied to zener diode DR05 exceeds the zener reference level, for example 6.2 volts.

After a power failure of the AC mains, or when the television receiver is initially coupled to the AC mains supply, series regulator 24 starts to conduct due to the A+ voltage coupled to the base transistor TR08 through resistors RR50 and RR56. However, until the voltage at the cathode of zener diode DR05 reaches the zener reference level, the voltage at the emitter of transistor TR08 is unregulated.

Assume a situation where battery XR01 is discharged or missing. The microprocessor becomes operational before VCC reaches its regulated level of 5 volts, e.g., at a threshold level for VCC of about 3 volts DC.

In order to ensure that microprocessor 22 initiates operation in a predetermined manner, a power-up reset signal is generated after the VCC voltage has reached a level adequate to reset internal registers in the microprocessor, including the program counter which defines the memory location of the instruction to be executed by the central processor. To create this sequence of events, capacitor CR21 is coupled to the cathode of zener diode DR05 and to the emitter of a PNP transistor TR06. The base of transistor TR06 is coupled to the emitter of transistor TR06 through a resistor RR46. The base of transistor TR06 is coupled to the collector of an NPN transistor TR07. The base of transistor TR07 is bypassed by a capacitor CR19, and coupled via a resistor RR93, to the collector of transistor TR06. The junction of zener diode DR05 anode and resistor RR81 is coupled to the base of transistor TR07 by a resistor RR89.

Initially when power appears at voltage terminal A+, capacitor CR21 begins to charge via resistor RR50. When capacitor CR21 has charged to 4 or 5 volts, sufficient VCC voltage is available to power microprocessor 22. Zener diode DR05 does not begin to conduct until a later time when the voltage across capacitor CR21 reaches 6.2 volts. After the voltage VC developed across capacitor CR21 exceeds 6.9 volts, transistor TR07 turns on, thereby turning on transistor TR06.

With transistor TR07 conducting, voltage VC is applied via series coupled capacitor CR14 and resistor RR63 to the base of a reset transistor TR12 in reset circuit 26. A parallel arrangement of a capacitor CR15 and a resistor RR64 is coupled between the is base of transistor TR12 and ground. The collector of transistor TR12 is coupled to the microprocessor reset pin, and to VCC via a resistor RR65.

Initially capacitors CR14 and CR15 of reset circuit 26 are discharged. When transistor TR06 turns on, both capacitors are charged by voltage VC. When the voltage across capacitor CR15 reaches 0.7 volt, transistor TR12 is turned on. When transistor TR12 conducts, the RESET input to microprocessor 22 is pulled down, thereby resetting the microprocessor. However, program execution will not commence until the reset line is released.

Capacitor CR14 continues to charge to the point where the capacitor blocks current from transistor TR06 to the base of transistor TR12. Transistor TR12 then turns off after holding the reset input to microprocessor 22 low for about 20 milliseconds. In this way, a negative going, momentary reset pulse, of fixed duration is generated at the RESET input.

When the reset line is released the microprocessor is initialized and program execution starts. One of the first instructions designates the status of the I/O ports and in particular makes pin 20 (STBY) an output with a high state following a reset operation. As described earlier, when STBY is high, the supply to the horizontal oscillator is inhibited which prevents generation of scanning waveforms and flyback derived power supplies. Hence a high STBY signal also inhibits coupling of horizontal rate flyback pulses to synchronize the SMPS 34. With STBY high the receiver is placed in the standby mode with the microprocessor waiting to receive a run command from either the keyboard switches or the remote control receiver.

Transistors TR06 and TR07 are also part of a hold circuit 25 which signals microprocessor 22 at its HOLD input that AC mains power has been lost. When the A+ voltage has decreased to the point that voltage VC is less than 6.9 volts, transistor TR06 and TR07 turn off, causing the microprocessor HOLD line to decay to zero volts. A low level on the Hold line causes a program interrupt to initiate a routine to store in the appropriate registers, operational parameters needed when power is restored. Since VCC to the microprocessor is sustained (as previously described), the HOLD interrupt will be processed before the VCC voltage has decreased below the minimum level needed to sustain operation of the microprocessor.

In accordance with an inventive feature, reset circuit 26 is also activated under television receiver fault conditions. For this purpose, the base of transistor TR12 is coupled to fault detection circuit 28, whereby the power-up reset signal is generated in the event of a detected fault.

A zener diode DR21, is coupled to the junction of a voltage divider defined by resistors RR94 and RR95, which are coupled in series between ground and the output of a peak rectified retrace pulse from a secondary winding W2 of flyback transformer FBT. The retrace pulse is coupled from winding W2 and is coupled via a series resistor RR95 and a diode DR22, and filtered by a capacitor CR95 to generate the peak rectified retrace pulse voltage sense signal VX, at the junction of voltage divider resistors RR95 and RR94.

Zener diode DR21 forms a threshold comparator conducting only when the voltage across the diode exceeds its breakdown voltage, for example 10 volts. Transistor TR12 is turned on when the peak rectified signal VX, from winding W2 exceeds the predetermined level defined by the voltage divider and zener diode DR21 breakdown voltage.

In this manner a reset signal is generated when the voltage on the power supplies coupled to the secondary windings of flyback transformer FBT are being overdriven. In the reset mode, microprocessor 22 places the television receiver in standby operation by disabling horizontal oscillator 130 of IC 30. With horizontal oscillator 130 stopped, the generation of flyback voltages ceases, resulting in the cessation of power supplies generated therefrom, hence providing the required overvoltage protection.

As an added advantageous feature, placing the television receiver in standby automatically releases the reset line of the microprocessor due to the disappearance of flyback pulse sense voltage VX and consequently, turning off of reset transistor TR12.

In addition to detection of overvoltage conditions in the secondaries of transformer FBT, fault detection circuit 28 detects potentially dangerous or damaging conditions in vertical deflection circuit 46.

The voltage across current sensing resistor RF01 in vertical output stage 32 is rectified by a diode DF06 and filtered by a capacitor CF16. The current in vertical deflection winding YV is an alternating current sawtooth. Diode DF06 and capacitor CF16 define a negative peak rectifier coupled to the AC voltage on the current sensing resistor RF01. In normal operation, the voltage at the cathode of diode DF06 has a negative peak of about −2.5 volts, DC.

The peak rectified voltage, −VS, at the anode of diode DF06, is coupled to the base of transistor TR12 through series resistors RF28 and RR64. At the junction of resistors RF28 and RR64, a positive reference voltage, of e.g. +5.4 volts, derived from a zener diode DP55, is summed with the negative voltage −VS. The reference voltage is generated by a zener diode DP55 coupled to a flyback generated positive supply, +V1, through a resistor RP56 and decoupled by a capacitor CP55. Resistors RF28 and RF29 are chosen such that normally the negative voltage at the anode of diode DF06 and the positive voltage at the anode of zener DP55 balance each other to keep transistor TR12 cut off.

In the event of short or open circuits in deflection winding YV or DC blocking capacitor CF01, the negative sense voltage −VS disappears or becomes positive. Thus no offset bias is available against the voltage from zener diode DP55 in order to keep transistor TR12 nonconductive. Transistor TR12 turns on and generates a reset to microprocessor 22. The television receiver is placed in the standby mode, disabling IC30 and its internal vertical oscillator. The reset thus prevents vertical output IC32 or the power supply from being damaged or allowed to overheat when the vertical output load is open or short circuited. The assumption of the standby mode disables the run mode power supplies thus preventing the possibility of the electron beam burning the phosphor surface of the display tube.

Following a reset generated by fault detection circuit 28, microprocessor 22 continues to operate in the normal manner in the standby mode, monitoring its inputs for a command, from the keyboard or remote, to initiate operation in the run mode. The microprocessor 22 may include in the initialization routine a is conditional jump as a function of whether or not the reset condition followed a power loss or a fault detection. The microprocessor may also be programmed to discriminate between a condition wherein it is possible to resume operation in the same manner as before reset, i.e., loss of AC mains power without fault, and a condition where the reset was generated by a fault.

The control program of microprocessor 22 may determine if a reset is generated due to a fault condition or as a consequence of powering up. Fault generated resets may be counted over some time period, and if some predetermined number is exceeded, the microprocessor may cease executing a user inputted run mode command, thus inhibiting operation in run mode. If the microprocessor permanently inhibits run operation, the television receiver must be disconnected from the AC power mains, or serviced, before the microprocessor will permit selection of the run mode of operation.

What is claimed is:

1. A video display device having fault protection apparatus for controlling said video display device, said fault protection apparatus comprising:
   a horizontal deflection circuit;
   a horizontal oscillator coupled to said horizontal deflection circuit and controlled to be operative in a run mode and inoperative in a standby mode;
   a run mode power supply energized by operation of said deflection circuit for supplying power to a run mode load;
   a fault detection circuit having at least one sensing input coupled to said run mode load to detect a fault condition and generating a reset signal responsive to detection of said fault condition; and
   a microprocessor control circuit having a reset input coupled to said reset signal and having an output signal coupled for controlling said operation of said horizontal oscillator, said microprocessor enabling said run mode absent detection of said fault condition and initiating said standby mode responsive to detection of said fault condition in said run mode load, said deflection circuit, said run mode power supply and said run mode load being thereby deactivated.

2. The video display device according to claim 1, wherein said microprocessor control circuit has programming to count fault generated reset signals inhibiting execution of user inputted run mode commands when a predetermined count is exceeded.

3. The video display device according to claim 1, wherein said microprocessor includes a nonvolatile memory, a hold input coupled to a power supply of said video display device, and further comprising means coupled to the hold input for providing a delay in loss of power to the microprocessor after loss of power at said power supply, the microprocessor being operable during said delay to store at least one operational parameter in said nonvolatile memory, and to initiate operation upon resumption of power as a function of said operational parameter.

4. The video display device according to claim 1, wherein the horizontal rate output stage includes a flyback transformer having a secondary winding coupled to the run mode power supply to generate a plurality of voltage supplies.

5. The video display device according to claim 1, wherein the fault detection circuit includes a voltage comparator coupled to said run mode load, the voltage comparator triggering the reset signal upon a voltage at the run mode load passing at least one predetermined limit voltage representing an internal fault condition.

6. The apparatus according to claim 5, wherein the predetermined limit voltage defines an overvoltage condition, wherein overvoltage at the run mode power supply occurs together with overvoltage at an ultor electrode such that disabling the deflection circuit provides X-ray protection.

7. The video display device according to claim 1, wherein said fault detection circuit is operable to detect at least one of a short circuit condition and an open circuit condition in said vertical deflection circuit.

8. The video display device according to claim 1, wherein said fault detection circuit is responsive to a fault condition in a vertical deflection circuit.

9. The video display device according to claim 8, wherein the vertical deflection circuit includes a deflection current sensing resistor, the fault detection circuit being coupled to the current sensing resistor.

10. The video display device according to claim 9, wherein the fault detection circuit includes a negative peak rectifier coupled to said deflection current sensing resistor, and a positive voltage reference supply coupled to an output of the negative peak rectifier, a switching transistor being coupled to the reset input and to sum of outputs of the negative peak rectifier and the positive voltage reference, whereby the fault detection circuit is operable to detect said open circuit and short circuit conditions by positive displacement of said sum of outputs.

11. The video display device according to claim 1, further comprising a means for reset signal generation coupled to said reset input and responsive to a fault condition in an AC supply coupled to said apparatus.

12. The video display device according to claim 11, wherein said reset signal generating means includes a delay circuit coupled between the reset input and a power supply voltage.

13. A video display apparatus including fault protection circuitry, said fault protection circuitry comprising:

a microprocessor control circuit having a reset input and a control signal output for selecting between a run mode and a standby mode of operation of said video display apparatus;

a first reset signal generating means coupled to sense AC power and generating a first reset signal responsive to detecting an application of AC power;

a second reset signal generating means coupled to detect a fault within said video display apparatus and generating a second reset signal responsive to said detected fault within said video display apparatus; and, said first and second reset signals being coupled to said microprocessor reset input to reset said microprocessor and said control signal output to select operation of said video display apparatus in said standby mode responsive to one of said first and second reset signals.

14. A video display having fault protection apparatus for controlling operation of said display, said apparatus, comprising:

a horizontal deflection circuit controlled to be operative in a run mode and inoperative in a standby mode;

a run mode power supply energized by operation of said horizontal deflection circuit for supplying power to a run mode load;

a vertical deflection circuit generating a vertical scanning component of said video display;

a fault detection circuit having at least one sensing input coupled to said vertical deflection circuit to detect a fault condition therein and generating a reset signal responsive to said fault condition in said vertical deflection circuit;

a microprocessor having a reset input, coupled to receive said reset signal, and generating an output control signal, said output control signal having a first condition for selecting a run mode and a second condition for selecting a standby mode, said output control signal being coupled to said horizontal deflection circuit to control said operation;

said microprocessor selecting said run mode absent said vertical deflection circuit fault condition and generating said output control signal having said first condition for activating said deflection circuit, said run mode power supply and said run mode load; and, said microprocessor initiating said standby mode responsive to a detected fault in said vertical deflection circuit and generating said output control signal having said second condition deactivating said deflection circuit, said run mode power supply and said run mode load.

15. The video display of claim 14, wherein said horizontal deflection circuit comprises a horizontal oscillator for energizing said horizontal deflection circuit and said run power supply, said horizontal oscillator being activated by said first condition and deactivated by said second condition.

16. The video display of claim 14, wherein said fault condition in said vertical deflection circuit corresponds to an open circuit deflection winding.

17. The video display of claim 14, wherein said fault condition in said vertical deflection circuit corresponds to a short circuit of a DC blocking capacitor.

18. The video display of claim 15, wherein said fault detecting circuit has a second sensing input coupled to detect a loss of AC power supply.

* * * * *